United States Patent
Ishida et al.

(10) Patent No.: US 12,319,276 B2
(45) Date of Patent: Jun. 3, 2025

(54) EVACUATION RUNNING ASSISTANCE SYSTEM

(71) Applicant: DENSO CORPORATION, Kariya (JP)

(72) Inventors: Syoya Ishida, Nisshin (JP); Shunya Kumano, Nisshin (JP); Tetsuya Takafuji, Kariya (JP); Ukyo Tanikawa, Nisshin (JP); Naoya Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 269 days.

(21) Appl. No.: 17/809,111

(22) Filed: Jun. 27, 2022

(65) Prior Publication Data

US 2022/0410877 A1   Dec. 29, 2022

(30) Foreign Application Priority Data

Jun. 29, 2021 (JP) .................................. 2021-107927

(51) Int. Cl.
  *B60W 30/08* (2012.01)
  *B60W 40/04* (2006.01)
  (Continued)

(52) U.S. Cl.
  CPC ............ *B60W 30/08* (2013.01); *B60W 40/04* (2013.01); *B60W 40/06* (2013.01);
  (Continued)

(58) Field of Classification Search
  CPC ...... B60W 30/08; B60W 40/04; B60W 40/06; B60W 40/105; B60W 40/12; B60W 50/0098; B60W 2050/0083; B60W 2420/403; B60W 2420/408; B60W 2552/53; B60W 2520/10; B60W 2552/10; B60W 2554/20; B60W 30/181;
  (Continued)

(56) References Cited

U.S. PATENT DOCUMENTS 9,523,984 B1 * 12/2016 Herbach ............... B60W 10/18
11,059,482 B2 * 7/2021 Miura ..................... B60Q 1/346
(Continued)

FOREIGN PATENT DOCUMENTS

JP     2007331652 A    12/2007
JP     2010125923 A     6/2010
(Continued)

*Primary Examiner* — Sze-Hon Kong
(74) *Attorney, Agent, or Firm* — Maschoff Brennan

(57) ABSTRACT

An evacuation running assistance system includes a peripheral environment recognizer to recognize at least a space of a road shoulder and a free space as a non-traffic portion, a time limit setter to set a time limit on the own vehicle for continuing evacuation running, and an evacuation place setter to determine at least one of the road shoulder space and the free space recognized by the peripheral environment recognizer as an evacuation place where the own vehicle is evacuated. A situation determiner determines a situation of an own vehicle as being in one of situations in which evacuation running is to be continued, running of an own vehicle is to be stopped on a lane, and road shoulder evacuation is to be performed based on the time limit. A controller controls the own vehicle based on the situation of the own vehicle determined by the situation determiner.

10 Claims, 10 Drawing Sheets

(51) Int. Cl.
    *B60W 40/06*         (2012.01)
    *B60W 40/105*      (2012.01)
    *B60W 40/12*        (2012.01)
    *B60W 50/00*        (2006.01)
    *G01S 13/931*      (2020.01)
    *G06V 10/44*        (2022.01)
    *G06V 20/56*        (2022.01)
    *G06V 20/58*        (2022.01)

(52) U.S. Cl.
    CPC .......... *B60W 40/105* (2013.01); *B60W 40/12* (2013.01); *B60W 50/0098* (2013.01); *G01S 13/931* (2013.01); *G06V 10/44* (2022.01); *G06V 20/582* (2022.01); *G06V 20/588* (2022.01); *B60W 2050/0083* (2013.01); *B60W 2420/403* (2013.01); *B60W 2420/408* (2024.01); *B60W 2552/53* (2020.02)

(58) Field of Classification Search
    CPC ..... B60W 30/18109; B60W 30/18163; B60W 50/12; G01S 13/931; G01S 13/867; G06V 10/44; G06V 20/582; G06V 20/588; G06V 20/58; G08G 1/143; G08G 1/147; B60K 28/06; B60Y 2302/05
    See application file for complete search history.

(56) References Cited

U.S. PATENT DOCUMENTS

| | | | |
|---|---|---|---|
| 11,169,521 B2* | 11/2021 | Park | B60W 50/045 |
| 2015/0345961 A1 | 12/2015 | Oooka et al. | |
| 2015/0345964 A1 | 12/2015 | Oooka et al. | |
| 2016/0137198 A1 | 5/2016 | Hauler et al. | |
| 2017/0113688 A1 | 4/2017 | Nakatsuka et al. | |
| 2017/0297567 A1 | 10/2017 | Matsumura | |
| 2018/0029604 A1* | 2/2018 | Niino | B60W 30/181 |
| 2018/0229736 A1 | 8/2018 | Narita et al. | |
| 2019/0039617 A1* | 2/2019 | Miura | B60W 30/165 |
| 2019/0056732 A1* | 2/2019 | Aoi | G08B 21/06 |
| 2019/0155283 A1* | 5/2019 | Herbach | G01C 21/3461 |
| 2019/0225237 A1* | 7/2019 | Ishikawa | B60W 50/082 |
| 2019/0235499 A1* | 8/2019 | Kazemi | G01S 7/417 |
| 2019/0250622 A1* | 8/2019 | Nister | G06V 20/584 |
| 2019/0263391 A1* | 8/2019 | Matsunaga | B60W 40/06 |
| 2020/0070841 A1 | 3/2020 | Sugano et al. | |
| 2020/0070842 A1 | 3/2020 | Sugano et al. | |
| 2020/0070843 A1 | 3/2020 | Sugano et al. | |
| 2020/0279487 A1* | 9/2020 | Toda | B60W 60/0015 |
| 2020/0290601 A1* | 9/2020 | Yamanaka | B60W 10/20 |
| 2020/0307632 A1* | 10/2020 | Tsuji | B60W 60/0059 |
| 2020/0307633 A1* | 10/2020 | Naruse | B60W 60/0059 |
| 2020/0307640 A1 | 10/2020 | Tsuji et al. | |
| 2021/0094575 A1* | 4/2021 | Sato | B60W 30/16 |
| 2021/0163039 A1* | 6/2021 | Iwamoto | B60W 60/007 |
| 2021/0229658 A1* | 7/2021 | Tsuji | B60W 60/0016 |
| 2021/0229705 A1* | 7/2021 | Tsuji | B60W 10/18 |
| 2021/0276561 A1* | 9/2021 | Hayakawa | B60W 30/0956 |
| 2021/0286651 A1* | 9/2021 | Ho | G06F 3/061 |
| 2021/0323568 A1* | 10/2021 | Kaino | B60W 60/001 |
| 2021/0403038 A1* | 12/2021 | Horigome | B60W 30/09 |
| 2022/0063669 A1* | 3/2022 | Fukushige | B60W 40/08 |
| 2022/0177007 A1* | 6/2022 | Nemoto | B60W 50/082 |
| 2022/0221298 A1* | 7/2022 | Chikamori | G01C 21/3658 |
| 2022/0314994 A1* | 10/2022 | Yamane | G08G 1/166 |
| 2022/0326711 A1* | 10/2022 | Gutlansky | G05D 1/617 |
| 2022/0340130 A1* | 10/2022 | Motoyama | G08G 1/09623 |
| 2023/0347939 A1* | 11/2023 | Nakano | B60W 60/0015 |
| 2023/0382371 A1* | 11/2023 | Park | B60W 30/0956 |
| 2024/0296428 A1* | 9/2024 | Horihata | G06Q 10/20 |

FOREIGN PATENT DOCUMENTS

| | | |
|---|---|---|
| JP | 2014106854 A | 6/2014 |
| JP | 2018052293 A | 4/2018 |
| JP | 2019174428 A | 10/2019 |
| JP | 2020-32963 A | 3/2020 |
| JP | 2020052791 A | 4/2020 |

* cited by examiner

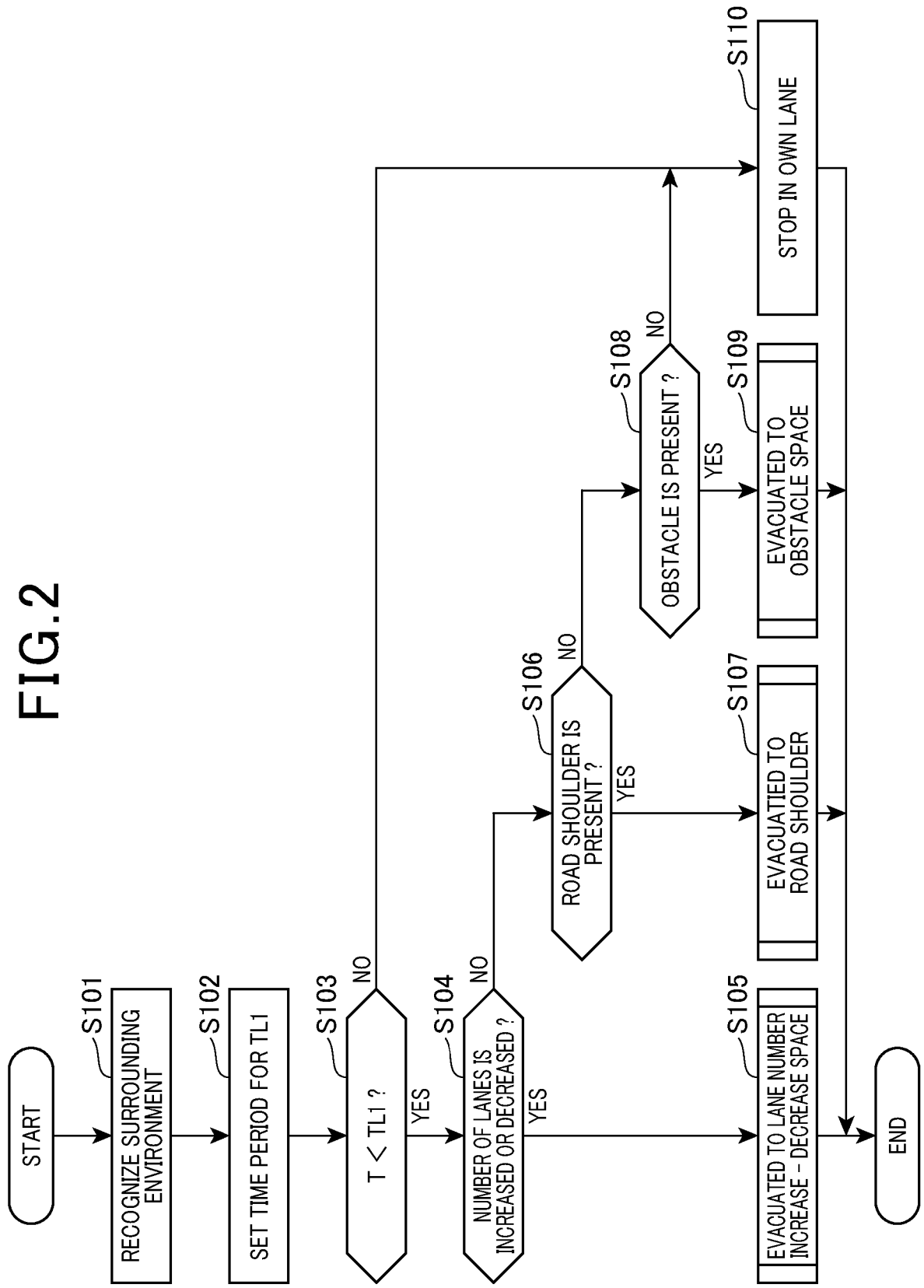

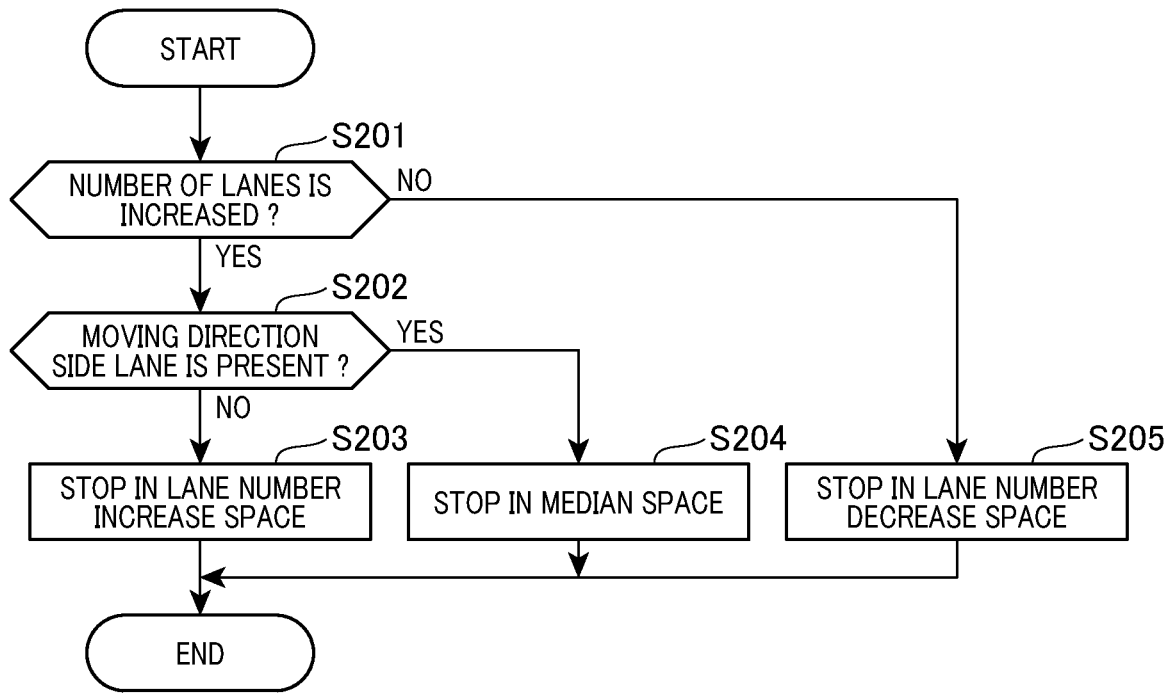
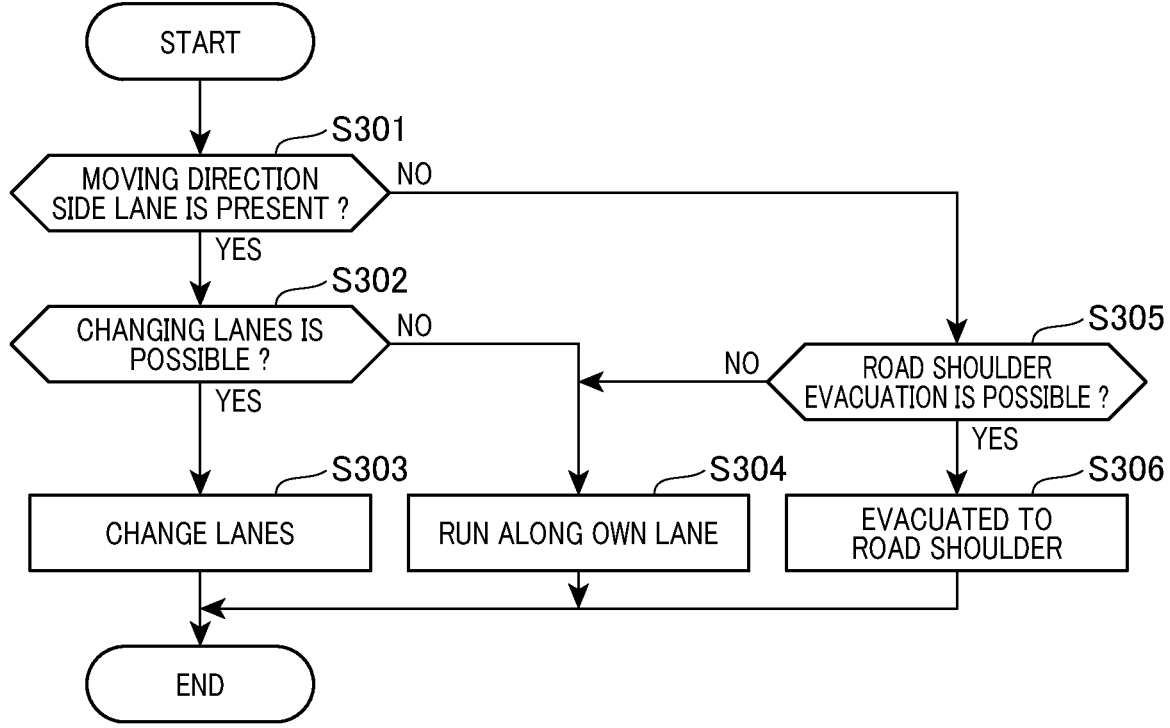

EVACUATION RUNNING ASSISTANCE SYSTEM

CROSS-REFERENCE TO RELATED APPLICATION

This patent application is based on and claims priority to Japanese Patent Application No. 2021-107927, filed on Jun. 29, 2021 in the Japan Patent office, the entire disclosure of which is hereby incorporated by reference herein.

BACKGROUND

Technical Field

The present disclosure relates to an evacuation running assistance system.

Related Art

An evacuation running assistance system has been proposed, which evacuates a vehicle to an evacuation destination when a driver becomes unable to operate due to a decrease in degree of consciousness or the like. In the past, to perform evacuation running safely, an area with poor visibility, for example, a curved road and straight roads before and after the curved road, is determined as a stop prohibition area in which a driver is prohibited from decelerating or stopping of an own vehicle each for evacuation running.

A conventional system designates an area having a high-risk during evacuation running as a stop prohibition area. However, the conventional system is silent about an area other than the stop prohibition area, in which safe evacuation running of an own vehicle is also needed. Further, to perform evacuation safely, it is preferable to set given places for evacuation places where an own vehicle can safely be evacuated in accordance with a condition of a road on which the own vehicle runs.

In view of this, the present disclosure is made to address and resolve the above-described problem, and it is an object of the present disclosure to set a give place for an evacuation place where an own vehicle can safely be evacuated in accordance with a situation of a road on which the own vehicle travels. Another object of the present disclosure is to provide a system capable of achieving safer evacuation running.

SUMMARY

Accordingly, one aspect of the present disclosure provides a novel evacuation running assistance system. The evacuation running assistance system includes: a peripheral environment recognizer to recognize at least a space of a road shoulder, a free space as a non-traffic portion appearing on a road due to a shape of a lane or an object located around the lane, and an existence of a vehicle around the own vehicle. The evacuation running assistance system also includes: a time limit setter to set a given time period for a time limit on the own vehicle for continuing evacuation running; and a road shoulder evacuation possibility determiner to determine if an own vehicle can be evacuated to the road shoulder based on the space of the road shoulder recognized by the peripheral environment recognizer. The evacuation running assistance system also includes: an evacuation place setter to determine at least one of the road shoulder space and the free space recognized by the peripheral environment recognizer as an evacuation place where the own vehicle is evacuated to; and a situation determiner to determine a situation of an own vehicle as being in one of situations in which evacuation running is continued, running of an own vehicle is stopped in a lane, and road shoulder evacuation is performed based on the time limit as set, the road shoulder evacuation possibility as determined, and the evacuation place as specified. The evacuation running assistance system also includes a controller to control the own vehicle based on the situation of the own vehicle determined by the situation determiner.

According to the evacuation assistance system of the present disclosure, the peripheral environment recognizer recognizes not only a space on a road shoulder of a road, but also a free space generated on the road by either a change in shape of a lane or an object installed around the lane. For example, when a non-traffic portion is generated on the road due to an increase or decrease in number of lanes, i.e., a change in shape of a lane, or an obstacle installed in the lane as an object around the lane, such a non-traffic portion is recognized as the free space. The evacuation place setter sets at least one of the shoulder space and the free space recognized by the peripheral environment recognizer for an evacuation place for the own vehicle as the evacuation destination. Hence, a given place where an own vehicle can safely be evacuated can be set for an evacuation place in accordance with a situation of a road on which the own vehicle travels. The situation determiner determines a situation of the own vehicle in accordance with an evacuation place (e.g., a road shoulder space or a free space) as set, a time limit, and a road shoulder evacuation possibility by specifying any one of the situations in which evacuation running is continued, on-lane stopping is performed, and shoulder evacuation is performed. Since the situation determiner refers to information on safe evacuation places set in accordance with a situation of the road on which the vehicle runs when determining the situation of the own vehicle, the situation determiner can determine the situation of the own vehicle based on a situation of a road on which the own vehicle travels. As a result, the controller can achieve safer evacuation running in accordance with a condition of the road on which the own vehicle is traveling.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 2 is a flowchart illustrating an exemplary evacuation running support process performed according to the first embodiment;

FIG. 3 is a flowchart illustrating an exemplary lane increase and decrease space process performed in the evacuation running support process of FIG. 2;

FIG. 4 is a flowchart illustrating an exemplary road shoulder evacuation process performed in the evacuation running support process of FIG. 2;

DETAILED DESCRIPTION

Figure 1:
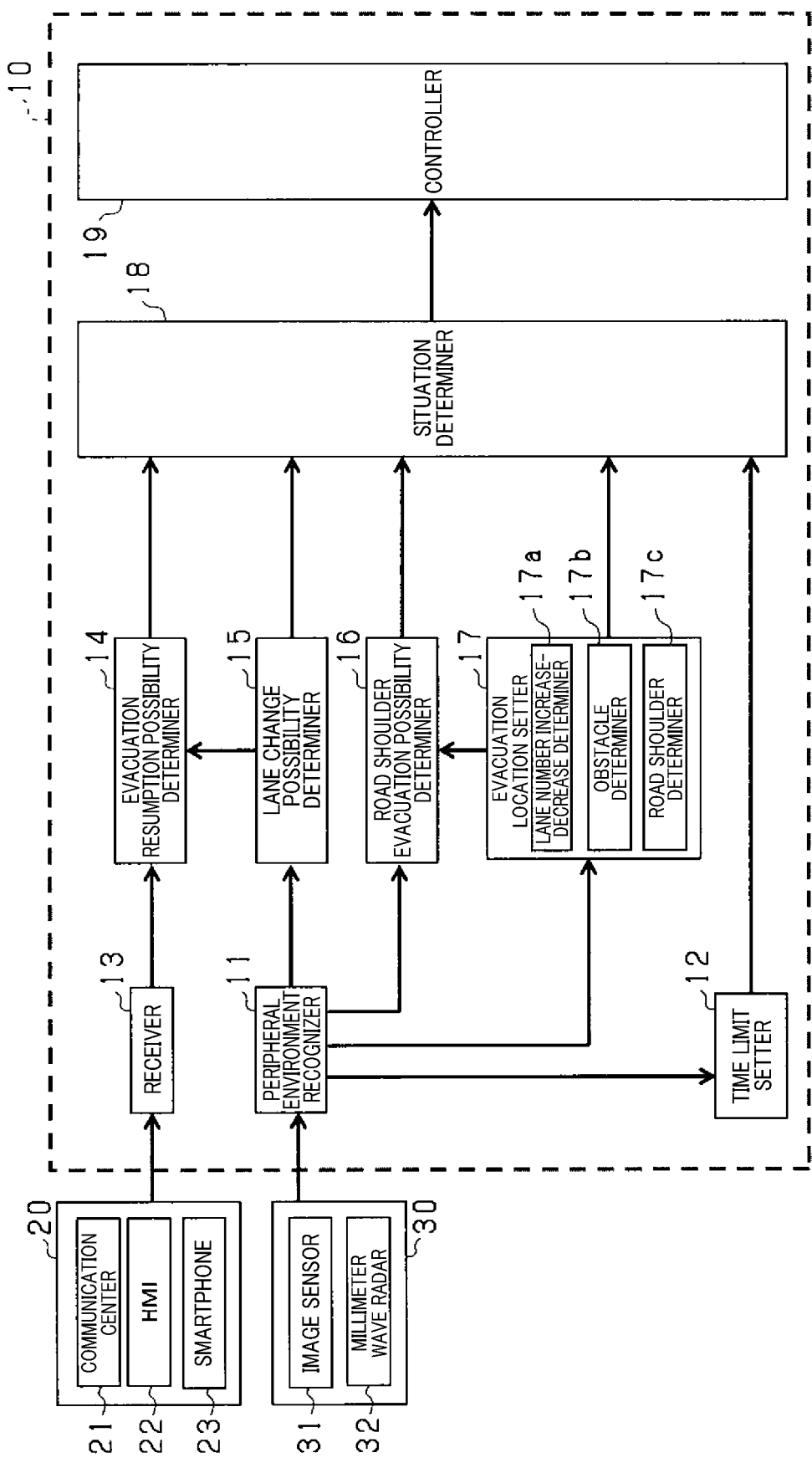
FIG. 1 is a block diagram illustrating an exemplary evacuation running support apparatus according to a first embodiment of the present disclosure.

Referring now to the drawings, wherein like reference numerals designate identical or corresponding parts throughout the several views thereof and to FIGS. 1 to 5, a first embodiment of the present disclosure is described. As shown, an evacuation running assistance system 10 is mounted on a vehicle or the like and functions to assist a driver and the vehicle in running toward and stopping at a safe evacuation destination when the driver becomes unable to drive due to a decrease in consciousness or the like.

As shown, the evacuation running assistance system 10 includes a peripheral environment recognizer 11, a time limit setter 12, and a receiver 13. The evacuation running assistance system 10 also includes an evacuation resumption determiner 14, a lane change possibility determiner 15, and a road shoulder evacuation possibility determiner 16. The evacuation running assistance system 10 further includes an evacuation place setter 17, a situation determiner 18, and a controller 19. The evacuation running assistance system 10 is mounted on a vehicle as an ECU equipped with a CPU (Central Processing Unit), a ROM (Read Only Memory), and a RAM (Random Access Memory), for example. The ECU also includes an I/O unit and the like. Hence, the CPU realizes each of these functions by executing programs installed in the ROM.

The peripheral environment recognizer 11 is enabled to recognize at least a space on a road shoulder of a road, a free space in a road, and presence of vehicles around an own vehicle. Here, the free space is a non-traffic portion (i.e., a portion in which a vehicle does not pass) caused on a road by a change in shape of a lane or an object located around the lane. Thus, the space on the road shoulder of the road is a space located outside of a road edge (i.e., outside of the road) which is a lateral end of the road. By contrast, the free space is a space generated between both side ends of the road (i.e., within the road).

The peripheral environment recognizer 11 is enabled to recognize a type, a size, and a distance from an own vehicle of an object existing in the vicinity of the own vehicle. The peripheral environment recognizer 11 recognizes such a type, a size, and a distance based on object detection information acquired from the object detection device, such as an in-vehicle radar device, an imaging device, etc. The peripheral environment recognizer 11 can also recognize a relative speed of the object. As shown in FIG. 1, the peripheral environment recognizer 11 can acquire object detection information from peripheral monitoring devices 30. Each of the peripheral monitoring devices 30 includes an image sensor 31 as an example of an imaging device and a millimeter wave radar 32 as an example of a radar system. Although not illustrated in FIG. 1, the peripheral environment recognizer 11 may be configured to acquire map information or the like, for example, via an in-vehicle GNSS (Global Navigation Satellite System) receiving device. That is, from map information and the like as acquired, road information about a road along which an own vehicle drives, and other roads around the road can be acquired. The road information includes a road shape, a lane, and a junction point. The road information also includes a road boundary and the like. A road shoulder space and a free space can be recognized from either object detection information or map information. The other vehicles and the like present around the own vehicle can be recognized based the object detection information. In addition to a function of acquiring the object detection information, the map information, the peripheral environment information from various sensors and the like, the peripheral environment recognizer 11 also has functions to serve as a road shoulder detector that detects a road shoulder based on the peripheral environment information, an obstacle detector that detects an obstacle in a road based on the peripheral environment information, and a free space recognizer that recognizes a free space based on the peripheral environment information.

The peripheral environment recognizer 11 estimates a non-traffic portion on a road where the own vehicle does not travel, and recognizes the non-traffic portion as a free space. For example, the peripheral environment recognizer 11 recognizes a road end (i.e., an edge) which is a lateral end of a road on which the own vehicle travels based on road information. Further, the peripheral environment recognizer 11 also estimates a non-traffic portion based on the road end and a travelling locus of a preceding vehicle preceding the own vehicle, and recognizes the non-traffic portion as estimated as a free space. By estimating the non-traffic portion in consideration of the travelling locus of the preceding vehicle, it is possible to avoid determination that a confluence lane constitutes the non-traffic portion, where a lane becomes wider due to merging of lanes.

Further, for example, the peripheral environment recognizer 11 may recognize a striped zone (i.e., a vehicle flow guiding zone) located around a median strip zone of a road on which an own vehicle travels, as a free space. The median strip of the road is a road surface marking indicated on the road and can be recognized based the object detection information. The median strip of the road can also be recognized from the map information. The striped zone may be recognized, for example, by a semantic segmentation application applied to image information acquired from an imaging device. Semantic segmentation is a deep learning algorithm that associates labels or categories with every pixel in an image, and is used to recognize assembly of pixels that form distinctive categories.

Further, when the peripheral environment recognizer 11 recognizes a set of dividing lines and a stationary object between the multiple dividing lines on a road on which an own vehicle travels, for example, the peripheral environment recognizer 11 may estimate a non-traffic portion placed around the stationary object between the multiple dividing lines based on a distance between the multiple dividing lines and the stationary object. Specifically, the peripheral environment recognizer 11 measures the distance between each of the multiple dividing lines and the stationary object. Then, if the distance between any dividing line and the stationary object is less than a given level allowing a vehicle to pass through (for example, it is shorter than a width of the vehicle), the peripheral environment recognizer 11 may estimate that front or rear sides of the stationary object on the lane are non-traffic portions. Then, the estimated non-passage portion may be recognized by the peripheral environment recognizer 11 as a free space. For example, even in a situation where a separation zone (e.g., median) is formed by two dividing lines, a non-traffic portion can be precisely estimated.

Further, the time limit setter 12 is configured to set a given time period for a time limit on an own vehicle to continue evacuation running. Here, the time limit is a period starting from a time when it is determined that a driver is unable to drive to a time when an own vehicle completes and stops evacuation running. The time limit is determined to be a given time not to greatly delay a rescue request. Hence, the time limit setter 12 can be configured to determine an amount of time limit in accordance with the road information and the object detection information as acquired from the peripheral environment recognizer 11.

Further, the receiver 13 receives information from an external communication system 20 installed outside of the evacuation running assistance system 10. The receiver 13 then transmits the information as received to an evacuation resumption possibility determiner 14. Here, as the external communication system 20, a system of a communication center 21, an HMI (Human Machine Interface) 22 serving as a means of transmitting information between a human and a machine, and a portable communication system, such as a smartphone 23, etc., are exemplified.

The evacuation resumption possibility determiner 14 determines if an own vehicle can resume evacuation running in accordance with a given condition after on-lane stopping is performed on an own lane where the own vehicle is driving. Here, the evacuation resumption possibility determiner 14 can determine if evacuation resumption is performed based on a result of such determination made by in-vehicle software stored in an ECU mounted on a vehicle or the like. Otherwise, the evacuation resumption possibility determiner 14 can determine if evacuation resumption is performed based on a result of such determination obtained by the evacuation resumption possibility determiner 14 from the external communication system 20 via the receiver 13.

Further, the lane change possibility determiner 15 is configured to determine if an own vehicle can change lanes. specifically, the lane change possibility determiner 15 determines if it is possible for the own vehicle to change lanes to an adjacent lane from a lane on which the own vehicle travels (i.e., an own lane), when the peripheral environment recognizer 11 recognizes an existence of either a space on a road shoulder or a free space and the adjacent lane between the own lane and the space of the road shoulder or the free space neighbors on the own lane.

Further, the road shoulder evacuation possibility determiner 16 is configured to determine if an own vehicle can be evacuated to the road shoulder in accordance with a space on the road shoulder recognized by the peripheral environment recognizer 11. That is, the road shoulder evacuation possibility determiner 16 determines if the own vehicle can be evacuated to the road shoulder. Specifically, when it can be determined in accordance with a position and a size of the space on the road shoulder recognized by the peripheral environment recognizer 11, and a position, a size, and a running speed of the own vehicle that the space on the road shoulder allows the own vehicle to safely stop there, the road shoulder evacuation possibility determiner 16 determines that evacuation of the own vehicle to the road shoulder is possible.

The evacuation place setter 17 sets a road shoulder space or a free space recognized by the peripheral environment recognizer 11 for an evacuation place that is an evacuation destination for an own vehicle. For the evacuation place, any one or both of the road shoulder space and the free space are set. For example, in a road with a narrow road shoulder, such as a general road, etc., a space on the road shoulder may be too narrow (i.e., not large enough) for an evacuation place for an own vehicle. If a road shoulder space is narrow but there is a sufficiently larger free space on the road, it is safer to stop at a place in the free space of a lane as an evacuation place. Hence, by evacuating an own vehicle to the free space as a destination thereof, evacuation running can be safe and a traffic jam can be avoided even in a situation where the space on the road shoulder of the road is relatively narrow.

When given places are set for multiple evacuation places, a destination of actual evacuation running may be selected by the situation determiner 18 among several evacuation places as set as described later more in detail. Further, the evacuation place setter 17 may select a destination to which an own vehicle performs evacuation running based on a given condition and sets the destination for one evacuation place. For example, the evacuation place setter 17 may be configured to set a free space for an evacuation place when the evacuation place setter 17 can determine that an own vehicle can stop at the free space based on a size of the free space, a relative position thereof to the own vehicle, a traveling speed of the own vehicle, and a size thereof or the like. Further, for example, the evacuation place setter 17 is configured to set a space on a road shoulder or a free space for an evacuation place for the evacuation place when it is determined that the space on the road shoulder or the free space can allow an own vehicle to safely move and stop there based on a running situation of each of the own vehicle and the other vehicles around the own vehicle.

Further, for example, a given free space existing in a direction of travelling of an own vehicle with a size sufficient for the own vehicle to stop is preferable as a free space. Here, the space large enough for the own vehicle to stop has a length in a lane extension direction (i.e., a longitudinal width) longer than an own vehicle in a longitudinal direction, and a length in a widthwise direction (i.e., a width) orthogonal to the lane extension direction longer than the own vehicle in a widthwise direction thereof. It is also preferable to employ margins in both the longitudinal and lateral directions, respectively. Further, a determination as to if a free space is set for an evacuation place may be made based on a traveling speed of an own vehicle (hereinafter sometimes referred to as an own vehicle speed) and a distance between a free space and the own vehicle. For example, if a distance between a current free space and an own vehicle is shorter than a distance traveled by the own vehicle from a time when deceleration is started at a given deceleration speed from a current speed to a time when the own vehicle stops running, the free space may not be set for the evacuation place by estimating that safe stopping might be impossible. Further, a place where parking is prohibited may not be set for an evacuation place, for example. However, if there is a high degree of urgency due to a level of unconscious of a driver or the like, the parking-prohibited place may be set as an evacuation place.

Further, the evacuation place setter 17 includes a lane number increase-decrease determiner 17a, an obstacle determiner 17b, and a road shoulder determiner 17c. Here, when the lane number increase-decrease determiner 17a has determined that the number of lanes increases or decreases, the evacuation place setter 17 may be configured to set a free space generated by the increase or decrease in number of lanes for an evacuation place. Further, when the obstacle determiner 17b has determined that an obstacle exists on a road, the evacuation place setter 17 may be configured to set a free space generated around the obstacle for an evacuation place. When the road shoulder determiner 17c has determined that a road shoulder is present on a road on which an own vehicle travels, a road shoulder space may be similarly set for an evacuation place.

The lane number increase-decrease determiner 17a is enabled to determine an increase or decrease in number of lanes on a road on which an own vehicle travels. The lane number increase-decrease determiner 17a may be configured to determine an increase or decrease in number of lanes, for example, based on a shape of a road on which an own vehicle travels. The increase or decrease in number of lanes may be recognized based on a detection result of either the image sensor 31 or the millimeter wave radar 32. Further, the lane number increase-decrease determiner 17a may be configured to determine an increase or decrease in number of lanes, for example, by recognizing an indication of at least one of a road surface marking and a signboard of a road traveled by an own vehicle. Here, the road surface marking and the signboard can be recognized based mainly on a detection result of the image sensor 31. With a provision of the lane number increase-decrease determiner 17a, it is possible to obtain a remarkable advantage in that a free space generated by the increase or decrease in number of lanes can be effectively utilized as an evacuation place. In addition, by using a free space generated by an increase or decrease in number of lanes as an evacuation place, it is possible to avoid an entry of an own vehicle traveling along a road to a traffic control area caused by construction work, for example.

Further, the obstacle determiner 17b is enabled to determine obstacles existing on a road on which an own vehicle travels. Specifically, based on a detection result obtained by the image sensor 31 or the millimeter wave radar 32, a determination as to if an obstacle is present on the road can be made. The obstacle determiner 17b may be configured to exclude a vehicle temporarily stopping at an intersection from the obstacles. The obstacle determiner 17b may be configured to determine that an obstacle exists on a road when an object having a given size or greater exists within a given distance inward from a road edge. The given distance is, for example, a lane width. The given size can be specified by a length in a lane extension direction (i.e., a vertical width), a length in a widthwise direction orthogonal to the lane extension direction (i.e., a lateral width), and a height of the object. Hence, for example, each threshold value is given to the vertical width, the lateral width, and the height, and when the threshold is exceeded in any one of the vertical width, the lateral width, and the height, it may be determined that an obstacle is present. Each threshold preferably has a value sufficient to impede passage of a vehicle. The evacuation place setter 17 may be configured to set an evacuation place having a given area having a given size in front of the obstacle in a lane where an obstacle recognized by the obstacle determiner 17b exists for a free space. When the free space in front of the obstacle is set for the evacuation place and evacuation is completed, the obstacle comes to position behind the own vehicle now parking at the evacuation place. Hence, the own vehicle can avoid collision with a following vehicle due to a help of the obstacle. From this point of view, it is preferable that the size of the obstacle is large enough to suppress or avoid collision with the following vehicle. The given distance thereof is, for example, a lane width. The given size thereof can be specified by a length in a lane extension direction (i.e., a vertical width), a length in a widthwise direction orthogonal to the lane extension direction (i.e., a lateral width), and a height of the object. Hence, for example, each threshold value is given to the longitudinal width, the lateral width, and the height, and when the threshold is exceeded in any one of the vertical width, the lateral width, and the height, it may be determined that an obstacle is present. Each threshold preferably has a value sufficient to impede passage of a vehicle. The evacuation place setter 17 may be configured to set an evacuation place having a given area having a given size in front of the obstacle in a lane where an obstacle recognized by the obstacle determiner 17b exists for a free space. When the free space in front of the obstacle is set for the evacuation place and evacuation thereto is completed, the obstacle comes to position behind the own vehicle now parking at the evacuation place. Hence, the own vehicle can avoid collision with a following vehicle due to a help of the obstacle. From this point of view, it is preferable that the size of the obstacle is large enough to suppress or avoid collision with the following vehicle.

Further, the evacuation place setter 17 is preferably configured to set an area having a given size in front of the obstacle excluding other objects on a lane where the obstacle recognized by the obstacle determiner 17b exists, for a free space. Here, the given size is a size enough for the own vehicle to stop. When a target, such as a pedestrian, etc., to be avoided is detected around the obstacle, a sufficient space may be secured to avoid the pedestrians, and a free space away from the obstacle may be set for the evacuation place.

Further, the road shoulder determiner 17c determines if a road shoulder is present on a road on which an own vehicle travels. The road shoulder determiner 17c may be configured to determine that a road shoulder exists when the road shoulder recognized by the peripheral environment recognizer 11 has a width sufficient for the own vehicle to stop. For example, when the width of the road shoulder is equal to or greater than a given threshold, it is determined that the road shoulder is present. By contrast, if it is less than or equal to the given threshold, the road shoulder may be determined to be absent.

Further, the situation determiner 18 may be configure to determine that an own vehicle is in one of situations where evacuation running is to be continued, on-lane stopping is to be performed, and evacuation to a road shoulder is to be performed. Specifically, the situation determiner 18 determines a situation of the own vehicle in accordance with the time limit set by the time limit setter 12, the road shoulder evacuation possibility of the own vehicle determined by the road shoulder evacuation possibility determiner 16, and the evacuation place set by the evacuation place setter 17. Here, the situation where the on-lane stopping is performed includes a situation where an own vehicle is stopped in a free space of a lane and a situation where an own vehicle is stopped on a space of a lane not recognized as a free space For example, when an evacuation place is a space on a road shoulder of a road and can allow immediate evacuation to the space on the road shoulder of the road, the own vehicle is determined to be in a situation in which road shoulder evacuation is to be performed. Further, if an evacuation place is a space on a road shoulder of a road but cannot allow immediate evacuation to the space on the road shoulder of the road, but allows evacuation thereto within a given time limit, the own vehicle may be determined to be in a situation in which evacuation running is to be continued. Further, if an evacuation place is a free space and can allow immediate evacuation to the free space, the own vehicle may be determined to be in a situation in which on-lane stopping is to be performed. Further, if an evacuation place cannot be reached within the time limit, the own vehicle is determined to be in a situation in which on-lane stopping is to be performed.

Further, the situation determiner 18 is preferably configured to select one of destinations to which evacuation running is actually executed, to determine a situation of the own vehicle based on the evacuation place as selected when both a road shoulder space and a free space have been set for evacuation places. For example, the destination may be selected in consideration of a speed and safety in evacuation running thereto based on a running situation of each of the own vehicle and other vehicles around the own vehicle, and a situation of the own vehicle may then be determined. Specifically, it may be determined that the own vehicle is in a situation in which the own vehicle completes evacuation to an evacuation place within a shorter evacuation time period. Alternatively, the own vehicle may be determined to be in a situation in that the own vehicle more safely performs evacuation to an evacuation place.

Further, the controller 17 is configured to control an own vehicle in accordance with a situation of the own vehicle determined by the situation determiner 16. That is, when it is determined that the own vehicle is in a situation to be controlled to continue evacuation running by running along the own lane or changing lanes and the like, the controller 17 controls the own vehicle to continue the evacuation running. By contrast, when it is determined that the own vehicle is in a situation to be controlled to perform the on-lane stopping, the controller 17 controls the own vehicle to stop in the lane (i.e., perform the on-lane stopping) while notifying a subsequent vehicle of stopping and/or decelerating of the own vehicle. When the own vehicle is stopped in the free space on the lane, the own vehicle is stopped there by performing an evacuation running with the free space as the destination. Further, when it is determined that the own vehicle is in a situation to be controlled to perform evacuation to a road shoulder, the controller 17 controls the own vehicle to move, decelerate, and stop at the road shoulder serving as an evacuation destination.

FIG. 2 is a flowchart illustrating an evacuation running assistance process executed and repeated at a given cycle by the evacuation running assistance system 10.

In step S101, the evacuation running assistance system 10 recognizes peripheral environment around an own vehicle. Specifically, the evacuation running assistance system 10 acquires object detection information from the object detector, and recognizes presence of a space on the road shoulder and other vehicles around the own vehicle based thereon. Subsequently, the process proceeds to step S102.

In step S102, the evacuation running assistance system 10 sets a time limit TL1. Here, the time limit TL1 is an upper limit for an own vehicle to be able to continue evacuation running. That is, continuous evacuation running of the own vehicle without limit may hinder rescue of a driver. Hence, the time limit TL1 of a given time suitable for the rescue of a driver is set. Subsequently, the process proceeds to step S103.

In step S103, the evacuation running assistance system 10 compares a current time T with the time limit TL1. Here, the current time T represents a time started from when it is determined that a driver cannot drive up to a present time. Hence, When the below described inequality is met, the process proceeds to step S104:

$$T<TL1.$$

By contrast, when the below described inequality is met, the process proceeds to step S120.

$$T \geq TL1.$$

In step S120, it is determined that the own vehicle is in a situation to be controlled to perform on-lane stopping to stop at the lane on which the own vehicle travels. Subsequently, the process is terminated.

Further, in step S104, it is determined if there is an increase or a decrease in number of lanes. The increase or decrease in number of lanes can be determined based on a change in shape of a road traveled by an own vehicle, road surface markings, indications of signboards recognized based on information transmitted from a peripheral monitoring system 30 and the like. If it is determined that there is the increase or decrease in number of lanes based on peripheral environment information acquired in step S101, the process proceeds to step S105. Then, in step S105, a free space (i.e., a lane increase-decrease space) generated by the lane increase-decrease is selected as a destination for evacuation running. That is, the process of step S105 is a process for selecting the lane increase-decrease space as a destination for evacuation running, and determining a situation of the own vehicle to be in a situation to perform the on-lane stopping. Then, the process is terminated.

In step S106, it is determined if there is space on a road shoulder of a road. If it is determined that there is a space on the road shoulder of the road, the process proceeds to step S107. Then, in step S107, the space on the road shoulder of the road is selected as a destination for evacuation running. As will be described later, in a process performed in step S107, an own vehicle is determined to be in either a situation in which road shoulder evacuation is performed or a situation in which evacuation running is continued. By contrast, if it is determined that there is no space on the road shoulder of the road, the process proceeds to step S108.

In step S108, it is determined if an obstacle exists in the road on which the vehicle travels. If it is determined that the obstacle is present, the process proceeds to step S109. Then, in step S109, a free space (i.e., an obstacle space) generated by the obstacle is selected as a destination for evacuation running. Hence, the process of step S109 is a process for selecting an obstacle space as a destination for evacuation running and for determining a situation of the own vehicle to be in a situation in which on-lane stopping is performed. After that, the process is terminated.

Figure 5:
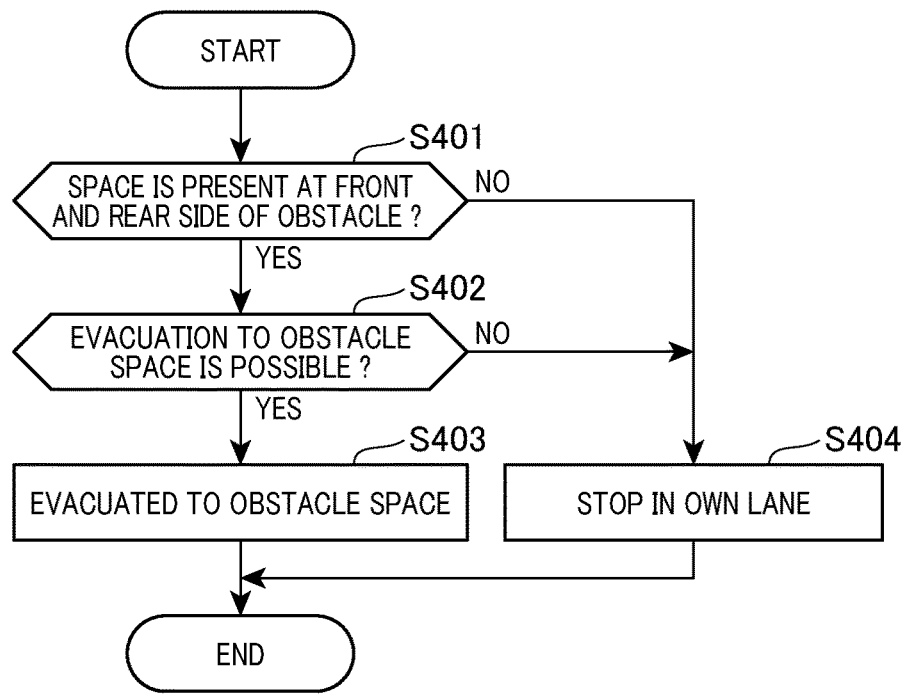
FIG. 5 is a flowchart illustrating exemplary obstacle space treatment performed in the evacuation running support process of FIG. 2.

Here, processes to be performed in steps S105, S107, and S109 are shown in FIGS. 3 to 5, respectively. As shown in FIG. 3, in the lane increase-decrease space process, it is determined if the number of lanes increases in step S201. If the number of lanes increases, the process proceeds to step S202. By contrast, if the number of lanes decreases, the process proceeds to step S205. Then, in step S205, it is determined that a free space (i.e., a lane decreasing space) generated by the decrease in number of lanes is set for a destination for evacuation running. Then, the process is terminated.

In step S202, it is determined if another lane is present beside the own lane in a direction in which the own vehicle is moving for evacuation (herein after sometimes simply referred to as either a moving side or a moving direction). Here, a lane located in the moving direction is a lane located closer to the road shoulder than the own vehicle. Hence, if the moving side lane is present, the process proceeds to step S204. In step S204, it is determined that a free space (i.e., a median strip space) generated by the median strip zone is set for a destination of evacuation running, and then the process is terminated. By contrast, if there is no lane in the moving direction, the process proceeds to step S203. In step S203, it is determined that the lane number increase space is set for the destination of the evacuation running. Then, the process is terminated.

In the road shoulder evacuation process shown in FIG. 4, it is determined in step S301 if another lane is present beside the own lane in a direction in which the own vehicle is moving for evacuation (herein after sometimes simply referred to as a moving direction). Here, the lane in the moving direction is a lane located closer to the road shoulder than the own vehicle, and is present between the own lane and the road shoulder. Hence, if the moving side lane is present, the process proceeds to step S302. By contrast, if there is no lane in the moving direction, the process proceeds to step S305.

In step S302, it is determined if the own vehicle can change lanes to the lane in the moving direction. For example, it can be determined if the own vehicle can change lanes, in accordance with the road information related to other roads around an own vehicle as obtained in step 101. It can also be determined if the own vehicle can change lanes in accordance with object detection information related to an object (especially a vehicle) around the own vehicle and a traveling speed of the own vehicle as acquired in step S101. Then, when it is determined that a change of lanes is possible, the process proceeds to step S303, and the own vehicle is controlled to change lanes. Then, the process is completed. By contrast, if it is impossible to change lanes, the process proceeds to step S304. In step S304, it is determined that own lane traveling is to be continued, and the process is then terminated. Hence, as performed in steps S301 to S303, when the lane is present in the moving direction and changing of lanes in the moving direction is possible, the own vehicle is controlled to change lanes to continue evacuation running. Hence, it is determined that the own vehicle is in a situation to be controlled to continue evacuation running.

Further, in step S305, it is determined if evacuation to a road shoulder is possible. When it is determined that the evacuation to the road shoulder is possible, the process proceeds to step S306 and evacuation to the road shoulder is executed in the step. Hence, as performed in steps S301, S305, and S306, when there is no lane in the moving direction, it is determined that the evacuation to the road shoulder is to be performed and evacuation to the road shoulder is executed.

In step S401 of an obstacle space evacuation process shown in FIG. 5, it is determined if there is a free space having a given size excluding other objects before and after the obstacle as recognized. Here, the given size is a size enough for the own vehicle to stop. More specifically, the space has a length in the lane extension direction (i.e., vertical length) longer than a length of the own vehicle in a vehicle longitudinal direction, and a length in the widthwise direction orthogonal to the lane extension direction (i.e., a lateral width) longer than the length of the own vehicle in the widthwise direction. The given size preferably has a margin added to each of the longitudinal width and the lateral width of the own vehicle. Hence, if the corresponding (an applicable) free space exists, the process proceeds to step S402. By contrast, If the corresponding (the applicable) free space does not exist, the process proceeds to step S404. In step S14, the own vehicle is stopped at a place other than the free space in the own lane and the process is then completed.

Further, in step S402, it is determined if the own vehicle can be evacuated to the obstacle space a presence of which has been already determined in step S401. If the own vehicle can be evacuated, the process proceeds to step S403. Then, in step S403, evacuation running to the obstacle space as the destination is executed. By contrast, if the own vehicle cannot be evacuated thereto, the process proceeds to step S404. Then, in step S404, the own vehicle is stopped in a place other than a free space in its own lane. After that, the process is terminated.

Figure 6:
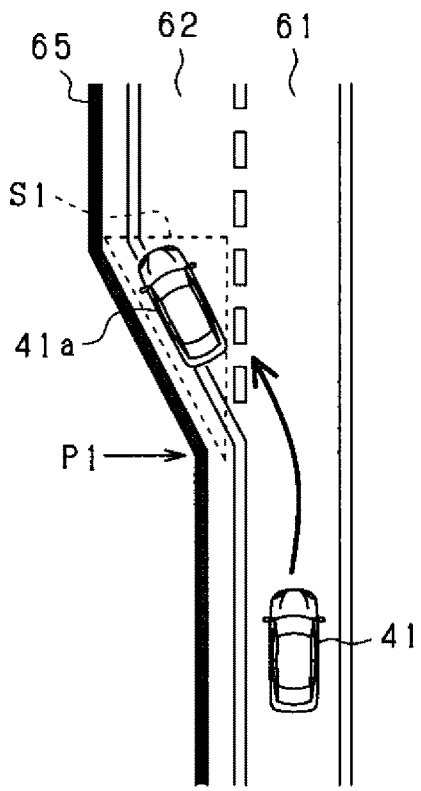
FIG. 6 is a diagram illustrating a situation of an own vehicle when the own vehicle has been evacuated to a lane increase space according to one embodiment of the present disclosure.

Next, a situation in which an own vehicle has been evacuated to either a road shoulder space or a free space will be described in more detail with reference to applicable drawings. FIG. 6 is a diagram illustrating a situation in which the own vehicle is evacuated to the lane increase space. A lane 61 traveled by the own vehicle 41 as an own lane is joined by a lane 62 at the left side thereof at a point P1 thereby forming two lanes. A retaining wall 65 is disposed beside a road shoulder of the lanes 61 and 62. A road shoulder between the retaining wall 65 and a left white line located at a left side of the lane 61 before the point P1 is relatively narrow. A road shoulder between the retaining wall 65 and a left white line located at a left side of the lane 62 beyond the point P1 is also relatively narrow. Hence, a sufficient space to safely park an own vehicle 41 cannot be secured on the road shoulder. However, an increase in number of lanes at the point P1 results in generation of a free space S1. That is, first, a road edge as a lateral end of a road traveled by an own vehicle is recognized. Then, a non-traffic portion on the road is estimated based on the road end and a travelling locus generated by a preceding vehicle of the own vehicle, and is recognized as the free space S1. Here, either the white line of the lane 61 closer to the road shoulder or the retaining wall 65 can be recognized as the road end. Further, the free space S1 is a non-traffic portion not passed by vehicles and extended forward from the point P1 when viewed from the own vehicle. Then, by setting the free space S1 for a destination as an evacuation place and evacuating and stopping an own vehicle 41 at a stop position 41a, the own vehicle 41 can be safely stopped on the lane even on the road excluding a road shoulder.

Figure 7:
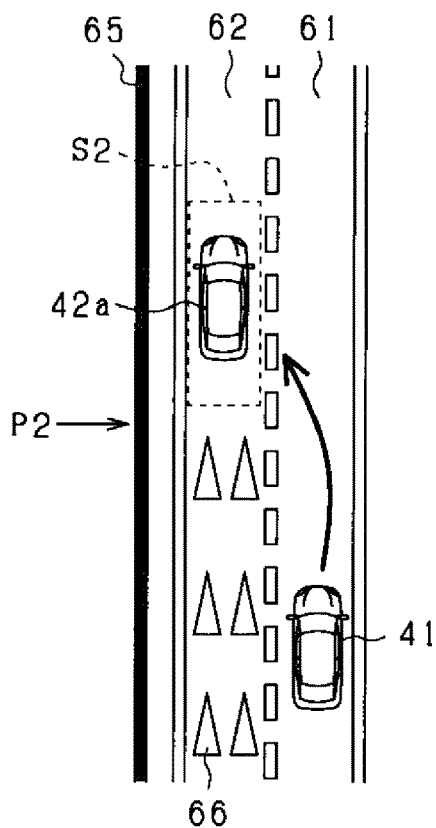
FIG. 7 is a diagram illustrating a situation of the own vehicle when the own vehicle has been evacuated to an obstacle space according to one embodiment of the present disclosure.

FIG. 7 is a diagram illustrating a situation in which an own vehicle is evacuated to an obstacle space. As shown, a lane 62 is located immediately close to the retaining wall 65 located beside a road shoulder of a road. At the same time, a lane 61 is located opposite to the road shoulder while contacting a right side of the lane 62. Multiple obstacles 66 are composed of triangular cones and are installed on the lane 62 by arranging two cones in a lane widthwise direction and three rows in a longitudinal direction thereof. Specifically, within a given distance from a white line which is drawn closer to the road shoulder on the lane 62 as a road edge, an obstacle 66 large enough to obstruct passage of a vehicle is installed. At the same time, an own vehicle 42 is driving on the lane 61. However, the road shoulder between the retaining wall 65 and the left side white line drawn on the lane 62 is relatively narrow, and accordingly, a sufficient road shoulder space enabling safe parking of the own vehicle 41 cannot be secured. However, since traveling of a vehicle is inhibited by the obstacles 66 existing on the lane 62, a free space S2 is generated beyond the point P2 which is a front end of the obstacles 66. Specifically, the free space S2 serves as an area existing beyond the point P2 in front of the own vehicle and is a non-traffic portion where a vehicle does not pass and other objects are absent. By setting the free space S2 for a destination as an evacuation place and evacuating and stopping an own vehicle 42 at a stopping position 42*a*, it becomes possible to safely stop the own vehicle 42 on the lane even on a road excluding a road shoulder.

Figure 8:
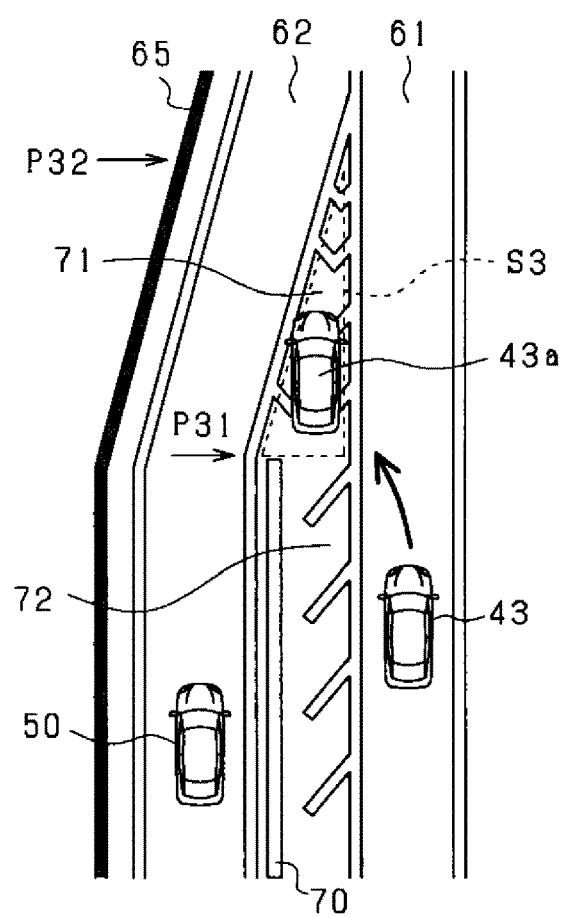
FIG. 8 is a diagram illustrating a situation of the vehicle when the own vehicle has been evacuated to a median divider separation zone space according to one embodiment of the present disclosure.

FIG. 8 is a diagram illustrating a situation in which an own vehicle is evacuated to a median strip zone space. That is, a lane 61 in which the own vehicle 43 travels and a lane 62 in which the other vehicle 50 travels are separated from each other by a median strip zone (i.e., a medial divider) 72. A separation wall 70 exists in the median strip 72 in the vicinity of the lane 62 and is extended up to a point P31. A striped zone 71 is extended forward from the point P31. At the point P31, the lane 62 slopes right toward the lane 61, so that the lane 61 and the lane 62 become adjacent via a white line at an end point of the striped zone 71 shrinking forward in a travelling direction of an own vehicle 43. As shown in FIG. 8, when a road shoulder is narrow and there is the median strip zone 72 and the lane 62 located beyond the median strip zone 72 beside the road shoulder, it is difficult to evacuate the own vehicle 43 to a space on the road shoulder. However, since the striped zone 71 exists ahead of the median strip zone 72, and it basically provides a non-passage portion, the striped zone 71 can be set for an evacuation place as a free space S3. Hence, by setting the free space S3 for a destination as an evacuation place, and evacuating and stopping the own vehicle 43 at a stop position 43*a*, the own vehicle 43 can be safely stopped within a road even if evacuation to the road shoulder is difficult.

Further, when a median strip zone is configured by multiple dividing lines and a stationary object is installed in the median strip zone, a presence of a non-traffic portion is estimated based on distances between the stationary object and the multiple dividing lines, thereby enabling recognition of a free space thereof. That is, when there is a signboard in the vicinity of the multiple dividing lines indicating a median strip zone, a presence of the median strip zone can be recognized by recognizing the signboard.

Figure 9:
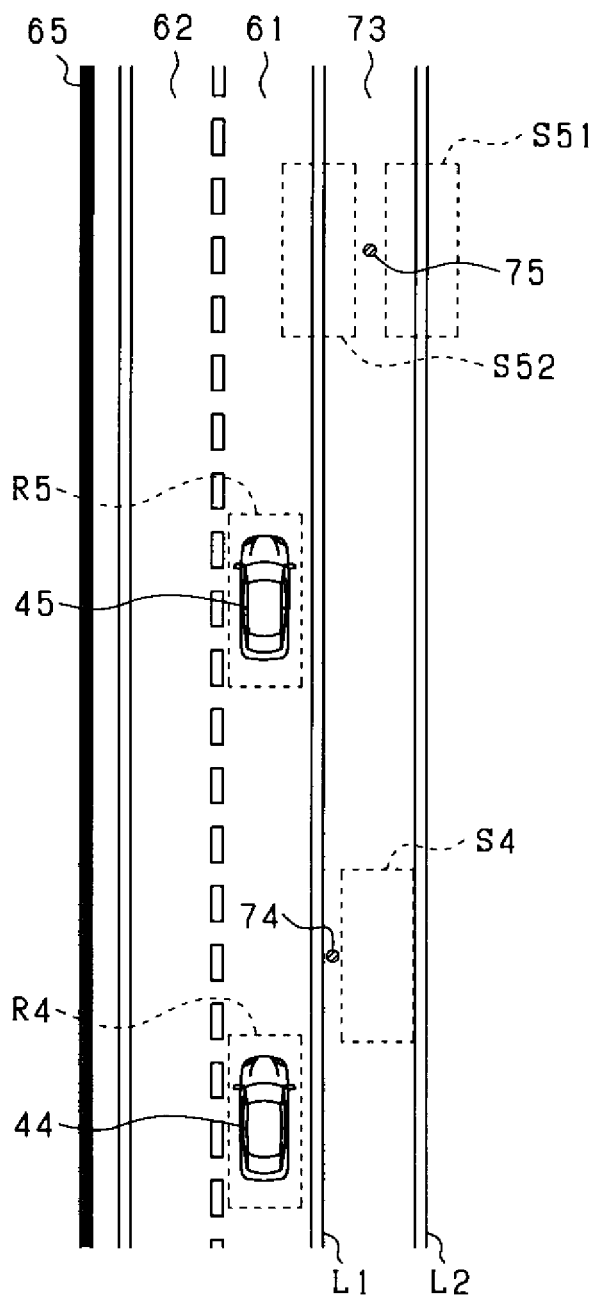
FIG. 9 is a diagram explaining estimation of a non-traffic portion when a stationary object is installed in a median strip zone divided by a multiple plot (i.e., mark) lines according to one embodiment of the present disclosure.

Further, as shown in FIG. 9, a lane 62 exists immediately close to the retaining wall 65 located beyond the road shoulder. Further, a lane 61 is located on a right side of the lane 62 opposite to the road shoulder of the road. Further, there is a median strip zone 73 on a right side of the lane 61 where vehicles 44 and 45 travel. Then, stationary objects 74 and 75 are installed between white lines L1 and L2 defining the median strip zone 73.

The stationary object 74 is installed near the left side white line L1 dividing the median strip zone 73. By contrast, the stationary object 74 is installed with a far distance from the right-side white line L2. A region R4 is substantially rectangular having the same vertical and lateral widths as a vehicle 44. A dimension of a region S4 is defined by placing the region R4 between the stationary object 74 and the white line L2. As shown in FIG. 9, the region S4 fits into an area between the stationary object 74 and the white line L2. For this reason, an area around the stationary object 74 can be passed through by a vehicle 44, and does not serve as a non-traffic portion. Hence, since the area around the stationary object 74 does not serve as a free space, the area cannot be set for an evacuation place.

By contrast, the stationary object 75 is installed in the median strip zone 73 at a widthwise center thereof in a widthwise direction. Hence, since the stationary object 75 is installed in the median strip zone 73 at a position, a distance from the left white line L1 and that from the right white line L2 are substantially the same. As shown, a region R5 is substantially rectangular having constant the same vertical and lateral widths as a vehicle 45. A dimension of each of regions S51 and S52 is defined by placing the region R5 on both left and right sides of the stationary object 75. As shown in FIG. 9, the region S51 shifted to the left from the stationary object 75 protrudes from the white line L1. By contrast, the region S52 shifted to the right from the stationary object 75 protrudes from the white line L2. For this reason, an area around the stationary object 75 does not correspond to a non-traffic portion through which the vehicle 45 can pass. Hence, an area within the median strip zone 73 around the stationary object 75 is recognized as a free space. Hence, if a size of the free space is large enough for (i.e., larger than) an own vehicle, the free space can be set for an evacuation place. The free space can be set before and after the stationary object 75 in the traveling direction. Here, it is preferable that a length (i.e., a longitudinal width) of the free space in a lane extension direction is longer than a length of an own vehicle in a back-and-forth direction. Also, it is preferable that a length (i.e., a lateral width) in a widthwise direction orthogonal to the lane extension direction is longer than a length in the widthwise direction of the own vehicle. Furthermore, it is further preferable that a margin is added to each of the longitudinal width and the lateral width.

Figure 10:
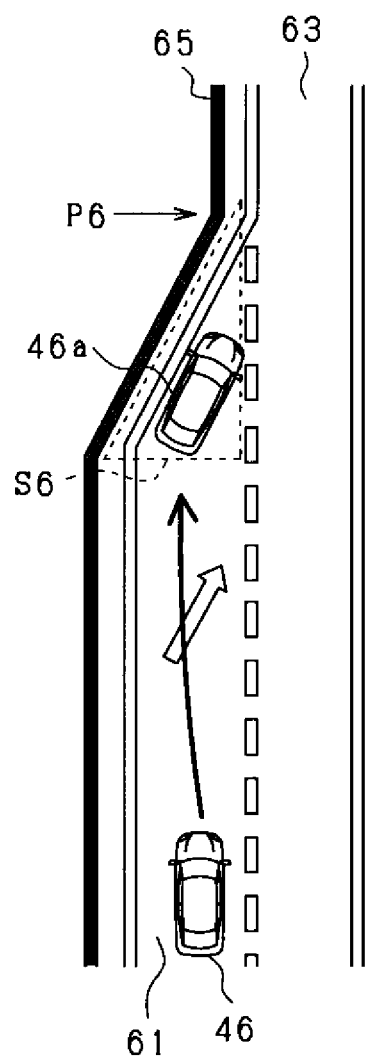
FIG. 10 is a diagram illustrating a situation of an own vehicle when the own vehicle has been evacuated to a lane reduction space according to one embodiment of the present disclosure.

FIG. 10 is a diagram illustrating a situation in which an own vehicle is evacuated to a lane reduction space. As shown, a lane 61, which is an own lane traveled by an own vehicle 46, is the closest lane to the retaining wall 65, and is in contact with an adjacent lane 63 at a right side of the lane 61 opposite to the retaining wall 65. Further, at a point P6, the lane 61 is narrowed and disappears while merging with the lane 63, thereby rendering two lanes into a single lane. Further, a road shoulder between the retaining wall 65 and a left white line of the lane 61 before the point P6 is relatively narrow. Also, a road shoulder between the retaining wall 65 and a left white line of the lane 63 after the point P6 is similarly relatively narrow. However, since the number of lanes increases at the point P6, a free space S6 is generated. The free space S1 (S6) is a non-traffic portion existing (i.e., extended) from the point P6 toward a front of the own vehicle (i.e., before the point 6) not to allow vehicles to pass through. Hence, by evacuating and stopping the own vehicle 46 at a stop position 46*a*, the own vehicle 46 can be safely stopped within a lane of a road excluding a road shoulder. Hence, although a road shoulder space sufficient to safely park an own vehicle 46 cannot be secured, since the number of lanes increases at the point P6, a free space S6 is generated. The free space S1 (S6) is a non-traffic portion existing (i.e., extended) from the point P6 toward a front of the own vehicle (i.e., before the point 6) not to allow vehicles to pass through. Hence, by evacuating and stopping the own vehicle 46 at a stop position 46*a*, the own vehicle 46 can be safely stopped within a lane of a road excluding a road shoulder.

Figure 11:
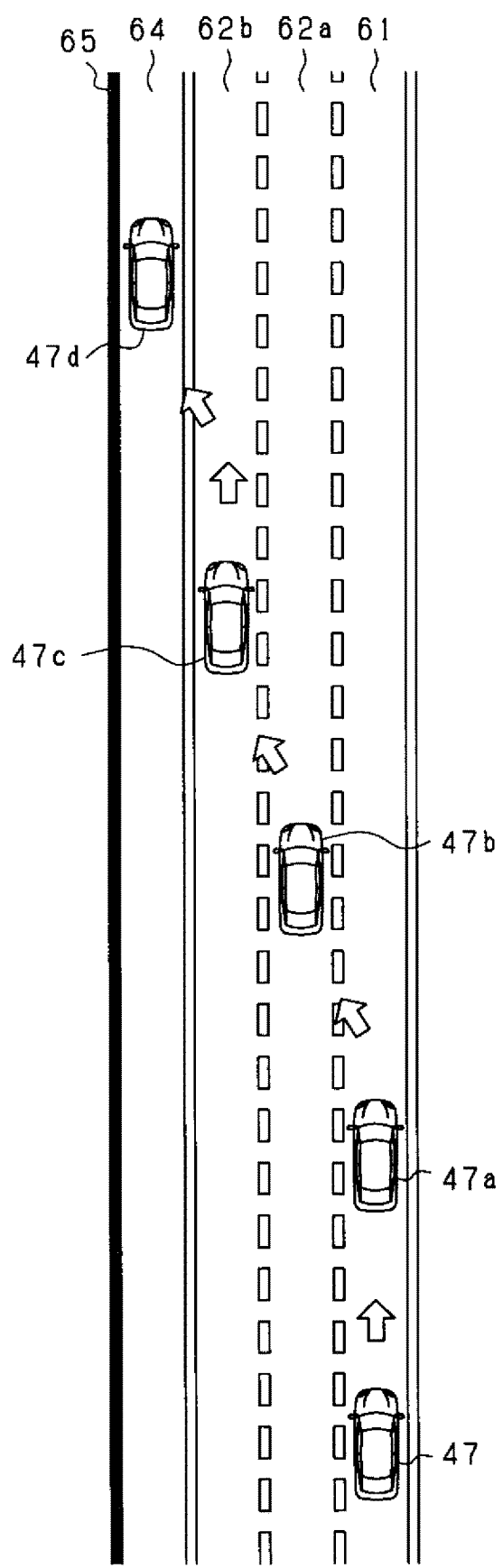
FIG. 11 is a diagram illustrating a situation of the own vehicle when the own vehicle executes road shoulder evacuation according to one embodiment of the present disclosure.

FIG. 11 shows a situation in which an own vehicle 47 executes road shoulder evacuation to a road shoulder 64 serving as a destination. When it is determined that an own vehicle 47 can change lanes at an own vehicle position 47*a* during traveling along a lane 61, the own vehicle 47 is controlled to change lanes from the lane 61 as the own lane to a lane 62*a* located in a moving direction. That is, the own vehicle 47 moves from the own vehicle position 47*a* to a new own vehicle position 47*b*. Then, substantially the same process is repeated, so that the own vehicle 47 is controlled to change lanes from the lane 62*a* of the own lane to a lane 62*b* located in the moving direction. Hence, the own vehicle 47 moves from the own vehicle position 47*b* to a new own vehicle position 47*c*.

Then, at the own vehicle position 47*c*, since there is no lane between the lane 62*b* of the own lane and the road shoulder 64, evacuation from the lane 62*b* of the own lane to the road shoulder 64 is performed. Hence, the own vehicle 47 is moved from the own vehicle position 47*c* to a new own vehicle position 47*d* and is stopped there. Hence, as shown in FIG. 11, if there is a sufficient space on the road shoulder 64 to safely stop the own vehicle and the own vehicle can be safely moved to the road shoulder 64 by changing lanes, the own vehicle 47 can be safely evacuated to the road shoulder 64. That is, a vehicle parked in a space on the road shoulder 64 can be safe because a risk of collision with a following vehicle is relatively lower than that of a vehicle parked in a free space on a road.

Figure 12:
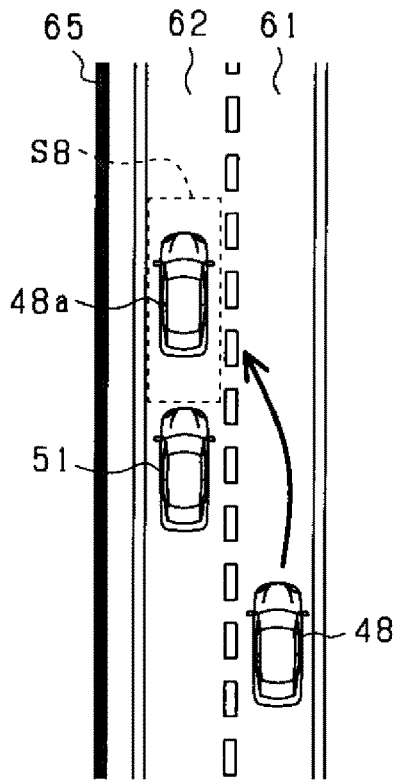
FIG. 12 is a diagram explaining a free space when the obstacle is a stopped vehicle according to one embodiment of the present disclosure.

Further, as shown in FIG. 12, an obstacle may be another vehicle 51 that stops on a lane 62. That is, it is determined that the other vehicle 51 currently stopping serves as an obstacle, and an area located beyond the other vehicle 51 having a given size excluding other objects is recognized as a free space S8. Then, by setting the free space S8 for a destination as an evacuation place and evacuating and stopping the own vehicle 48 at a stop position 48*a*, the vehicle 48 can be safely stopped on a lane even on a road excluding a road shoulder.

Figure 13:
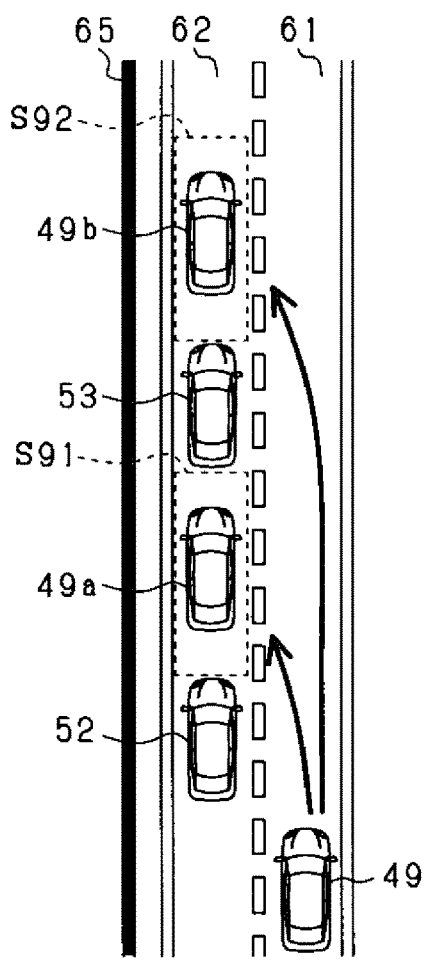
FIG. 13 is a diagram explaining a free space when obstacles are constituted by multiple stopping vehicles according to one embodiment of the present disclosure.

Further, as shown in FIG. 13, when there are multiple stopping vehicles including a vehicle 52 in front of an own vehicle 49 and yet another stopping vehicle 53 is present ahead of the other stopping vehicle 52, a free space S91 is formed between the other vehicles 52 and 53 and may be recognized. Hence, both a free space S91 formed between the other vehicles 52 and 53 and a free space S92 formed in front of the other vehicle 53 may be set for evacuation places, and an own vehicle 49 may be stopped at one of stop positions 49*a* and 49*b*. In such a situation in which multiple vehicles are continuously stopping, it is preferable from a viewpoint of safely performing evacuation running to set a free space like a free space S92 located in front of a leading vehicle for a destination. However, based on a particular situation of the own vehicle and a surrounding situation around the own vehicle, evacuation running may be performed to the free space S91 as a destination.

Figure 14:
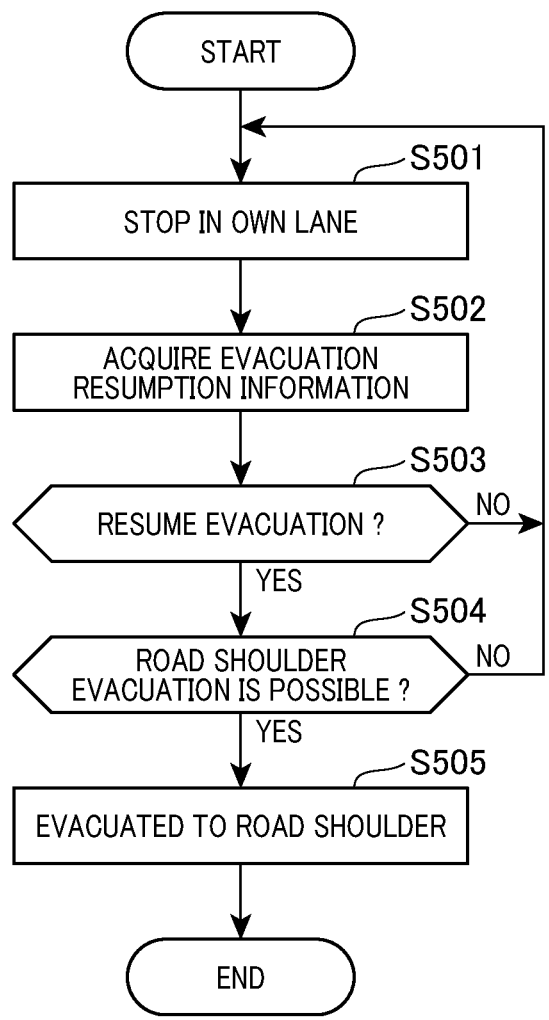
FIG. 14 is a flowchart illustrating an exemplary evacuation resumption determination process additionally executed after the own vehicle is stopped according to one embodiment of the present disclosure.

Further, as illustrated in FIGS. 2 to 5 by using flowcharts, after executing a process of stopping the own vehicle on the own lane, an evacuation resumption determination process may be executed. FIG. 14 is a flowchart illustrating such an evacuation resumption determination process. As shown in step S501, after the own vehicle enters a stopping state on its own lane, the process proceeds to step S502. In step S502, evacuation resumption information is acquired. Specifically, an evacuation resumption possibility determination result is acquired via the external communication system 20 and/or the evacuation resumption determination result calculated by the in-vehicle software is acquired. Then, the process proceeds to step S503.

In step S503, it is determined if evacuation running can be resumed. In step S503, if it is determined that the evacuation running can be resumed, the process proceeds to step S504. By contrast, it is determined that the evacuation running cannot be resumed, the process returns to step S501. Then, the own vehicle is controlled to continuously stop at the own vehicle lane.

Hence, in step S504, it is determined if the own vehicle can be evacuated to a road shoulder. When it is determined that the evacuation thereto is possible, the process proceeds to step S505. In step S505, the own vehicle is controlled to be evacuated to the road shoulder as an evacuation destination. After that, the process is terminated.

According to the evacuation running support process shown in FIG. 14, if it is determined when the own vehicle is in a state of the on-lane stopping that the own vehicle can be evacuated to the road shoulder of the road based on peripheral environment information around the own vehicle, evacuation running can be resumed so that the own vehicle can be evacuated to the road shoulder of the road safer than the lane.

According to each of the above-described embodiments, the following advantages can be obtained.

The evacuation running assistance system 10 includes the peripheral environment recognizer 11, the time limit setter 12, and the road shoulder evacuation determiner 16. The evacuation running assistance system 10 also includes an evacuation place setter 17, the situation determiner 18, and the controller 19.

Here, the peripheral environment recognizer 11 is enabled to recognize a presence of at least a space of a road shoulder, a free space as a non-traffic portion on the road caused by either a change in shape of a lane or an object placed around the lane, and one or more other vehicles around an own vehicle. The time limit setter 12 sets a given time for a time limit within which an own vehicle is allowed to continue evacuation running.

The road shoulder evacuation possibility determiner 16 determines if an own vehicle can be evacuated to the road shoulder in accordance with a space on the road shoulder recognized by the peripheral environment recognizer 11. That is, the road shoulder evacuation possibility determiner 14 determines if the own vehicle can be evacuated to the road shoulder. The evacuation place setter 17 may set at least one of a road shoulder space and a free space recognized by the peripheral environment recognizer 11 for an evacuation place as an evacuation destination of the own vehicle. The situation determiner 18 determines a current situation of the own vehicle in accordance with the time limit as set, the road shoulder evacuation possibility as determined, and the evacuation place as set. The situation determiner 18 determines the current situation of the own vehicle by selecting one of situations where evacuation running is to be continued, on-lane stopping is to be performed, and evacuation to a road shoulder is performed. The controller 19 controls the own vehicle in accordance with the situation of the own vehicle determined by the situation determiner 18.

According to the evacuation running assistance system 10 of one embodiment of the present disclosure, the peripheral environment recognizer 11 recognizes not only a space on a road shoulder of a road, but also a free space generated on a road by a shape of a lane and objects placed around the lane. The evacuation place setter 17 sets at least one of the road shoulder space and the free space recognized by the peripheral environment recognizer 11 for an evacuation place as an evacuation destination of the own vehicle. For this reason, an evacuation place where an own vehicle can safely be evacuated can be set for the own vehicle in accordance with a condition of a road on which the own vehicle is traveling. Further, based on an evacuation place (e.g., a road shoulder space or a free space) as set, a time limit, and possibility of road shoulder evacuation, the situation determiner 18 determines a situation of an own vehicle among a situation in which evacuation running is continued, a situation in which on-lane stopping is performed, and a situation in which road shoulder evacuation is performed. Further, because the situation determiner 18 refers to information on a safe evacuation place set in accordance with the situation of the road on which the own vehicle runs, the situation determiner 18 can determine a situation of an own vehicle based on a situation of a road on which the own vehicle travels. As a result, the controller 19 can control safer evacuation running based on conditions of a road on which the own vehicle travels.

The evacuation place setter 17 may include a lane number increase-decrease determiner 17a capable of determining an increase or decrease in number of lanes on a road traveled by an own vehicle. In such a situation, the evacuation place setter 17 can set a free space generated by an increase or decrease in number of lanes for an evacuation place when it is determined by the lane number increase-decrease determiner 17a that the number of lanes is increased or decreased. Hence, it is possible to obtain a remarkable advantage never seen before, in that a free space generated by an increase or decrease in number of lanes can be effectively utilized as an evacuation place. In addition, by using a free space generated by an increase or decrease in number of lanes as an evacuation place, it is possible to avoid an entry of an own vehicle in evacuation running to a traffic regulation area prepared for construction.

Further, the lane number increase-decrease determiner 17a can be configured to determine an increase-decrease in the number of lanes based on a shape of a road traveled by an own vehicle as recognized based on a detection result of either an imaging device or a radar device. Further, the lane number increase-decrease determiner 17a can be configured to determine an increase or decrease in number of lanes by recognizing either a road surface marking or a signboard of a road on which an own vehicle travels.

Further, the peripheral environment recognizer 11 can be configured to recognize a road edge as a lateral end of a road on which an own vehicle travels, and then recognize a non-traffic portion generated on the road as a free space, which is estimated based on the roadside and a travelling locus of a preceding vehicle of the own vehicle. Hence, by estimating the non-traffic portion in consideration of the travelling locus of the preceding vehicle, it is possible to avoid erroneous determination that a merging lane is a non-traffic portion when a lane is widened due to merging of lanes.

The peripheral environment recognizer 11 can be configured to recognize a striped zone located around a median strip zone of a road on which an own vehicle travels, as a free space.

Further, when the peripheral environment recognizer 11 recognizes multiple dividing lines on a road traveled by the own vehicle and a stationary object existing between the multiple dividing lines, the peripheral environment recognizer 11 can be configured to estimate a non-traffic portion between the multiple dividing lines around the stationary object based on distances between each of the multiple dividing lines and the stationary object. Then, the peripheral environment recognizer 11 can be configured to recognize the non-traffic portion as a free space. For example, even in a situation where a separation zone is configured by two dividing lines, a non-traffic portion can be appropriately estimated.

Further, the evacuation place setter 17 can be configured to set a free space for an evacuation place when it is determined that an own vehicle can be stopped in the free space based on a size of the free space, a position thereof relative to the own vehicle, and a traveling speed and a size of the own vehicle.

Further, the evacuation place setter 17 may include an obstacle determiner 17b capable of determining presence of an obstacle in a road traveled by an own vehicle. In such a situation, the evacuation place setter 17 can be configured to set a free space generated around an obstacle for an evacuation place when it is determined that the obstacle is present by the obstacle determiner 17b.

Further, the peripheral environment recognizer 11 can be configured to recognize a road edge that is a lateral edge of a road on which an own vehicle travels. At the same time, the obstacle determiner 17b can be configured to determine that an obstacle exists when an object having a given size exists within a given distance from the road edge. That is, an object of a given size existing within the given distance from the road edge impedes passage of vehicles and creates a non-traffic portion. In addition, the obstacle having the given size can prevent an own vehicle from colliding with the following vehicle.

Further, the evacuation place setter 17 can be configured to set an area for a free space, on a lane with an obstacle recognized by the obstacle determiner 17b, in front of the obstacle having a given size excluding other objects. When the free space in front of the obstacle is set for the evacuation place, since there is an obstacle behind an own vehicle parked at the evacuation place, the own vehicle can avoid collision with the following vehicle due to presence of the obstacle Further, when it is determined based on a driving situation of an own vehicle and a driving situation of a vehicle around the own vehicle that a road shoulder space or a free space allows an own vehicle to safely move and stop there, the evacuation place setter 17 can be configured to set the space on the road shoulder or the free space for an evacuation place. Hence, safety of evacuation running can be improved.

Here, the controller and the method using the controller described in the present disclosure may be implemented by a dedicated computer constituted by a processor programmed to perform one or more functions embodied by computer program and a memory. Alternatively, the controller and the method using the controller described in the present disclosure may be implemented by a dedicated computer constituted by a processor including one or more dedicated hardware logic circuits. Alternatively, the controller and the method using the controller described in the present disclosure may be achieved by one or more dedicated computers composed of a processor programmed to perform one or more functions and a processor composed of a memory and one or more hardware logic circuits. Further, the computer program as instructions executed by a computer may be stored in a computer-readable non-transitory tangible recording medium.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described evacuation running assistance system and may be altered as appropriate.

What is claimed is:

1. An evacuation running assistance system, comprising:
a peripheral environment recognizer configured to perform a recognition of a presence of:
   (i) a space on a road shoulder that is a shoulder of a target road in which an own vehicle is traveling; and
   (ii) a free space as a non-traffic portion generated on the target road by either a change in shape of a lane or an object located around a lane, and a vehicle around the own vehicle;
a time limit setter configured to set a time limit on the own vehicle for continuing evacuation running;
a first determiner configured to determine whether the free space exists on the target road based on a recognition result of the peripheral environment recognizer;
a second determiner configured to determine whether the space exists on the road shoulder in response to determining that the free space does not exist on the target road;
an evacuation place setter configured to:
   (i) set the free space on the target road as an evacuation place in response to the first determiner determining that the free space exists on the target road; or
   (ii) set the space on the road shoulder as the evacuation place in response to the second determiner determining that the space exists on the road shoulder;
a situation determiner configured to determine a situation of the own vehicle from among multiple situations based on (i) the time limit as set, and (ii) the evacuation place set by the evacuation place setter, the multiple situations including:
   (i) a first situation in which evacuation running is to be continued;
   (ii) a second situation in which a free-space evacuation is to be performed upon the free space being set as the evacuation place; and
   (iii) a third situation in which road shoulder evacuation is to be performed upon the space on the road shoulder being set as the evacuation place; and
a controller to control the own vehicle based on the situation of the own vehicle determined by the situation determiner, wherein:
the peripheral environment recognizer is configured to perform one of:
a first task of recognizing a lateral edge of the target road, and to estimate a non-traffic portion based on the road edge and a traveling locus of a preceding vehicle preceding the own vehicle, the peripheral environment recognizer recognizing the non-traffic portion as the free space; and
a second task of:
   recognizing multiple dividing lines on the target road where the own vehicle travels and a stationary object existing between the multiple dividing lines; and
   estimating, as the non-traffic portion, a portion generated around the stationary object between the multiple dividing lines in response to recognition of the multiple dividing lines and the stationary object, based on each of distances between the multiple dividing lines and the stationary object to accordingly recognize the non-traffic portion as the free space.

2. The evacuation running assistance system as claimed in claim 1, wherein the evacuation place setter includes a lane number increase-decrease determiner configured to determine an increase or a decrease in number of lanes on the target road,
wherein, when it is determined by the lane number increase-decrease determiner that the free space generated by the increase or the decrease in number of lanes on the target road, the evacuation place setter is configured to set the free space as the evacuation place.

3. The evacuation running assistance system as claimed in claim 2, wherein the lane number increase-decrease determiner is configured to determine the increase or the decrease in number of lanes based on a shape of the target road, the shape being recognized based on a detection result obtained by an imaging device or a radar device connected to the evacuation running assistance system.

4. The evacuation running assistance system as claimed in claim 2, wherein the lane number increase-decrease determiner is configured to determine the increase or the decrease in number of lanes by recognizing at least one of a road surface marking and a signboard indicated for the target road.

5. The evacuation running assistance system as claimed in claim 1, wherein the peripheral environment recognizer is configured to recognize a striped zone connected to a leading end of a median strip zone of the target road as the free space.

6. The evacuation running assistance system as claimed in claim 1, wherein the evacuation place setter is configured to set the free space as the evacuation place when it is determined that the own vehicle can stop in the free space based on a size of the free space and a relative position of the free space to the own vehicle, and a traveling speed and a size of the own vehicle.

7. The evacuation running assistance system as claimed in claim 1, wherein the evacuation place setter includes an obstacle presence determiner to determine if an obstacle exists on the target road, wherein the evacuation place setter sets, as the free space for the evacuation place, a space generated around the obstacle in response to a determination made by the obstacle presence determiner that the obstacle is present.

8. The evacuation running assistance system as claimed in claim 7, wherein the peripheral environment recognizer recognizes a lateral road edge of the target road, wherein the obstacle presence determiner determines that an obstacle exists when an object having a given size exists within a given distance from the road edge.

9. The evacuation running assistance system as claimed in claim 7, wherein the evacuation place setter sets, as the free space for the evacuation place, a given area having a given size excluding other objects and located in front of the obstacle on the lane on which the obstacle is recognized by the obstacle presence determiner.

10. The evacuation running assistance system as claimed in claim 1, wherein the evacuation place setter is configured to:
determine whether the own vehicle can move safely and stop at the free space in response to determination that the free space is placed on the target road;
set the free space as the evacuation place in response to determination that the own vehicle can move safely and stop at the free space;
determine whether the own vehicle can move safely and stop at the space of the road shoulder in response to determination that the space of the road shoulder is placed on the target road; and set the space of the road shoulder as the evacuation place in response to determination that the own vehicle can move safely and stop at the space of the road shoulder.

\* \* \* \* \*